No. 854,567.
PATENTED MAY 21, 1907.
J. F. CARTER.
ANIMAL POKE.
APPLICATION FILED OCT. 24, 1906.
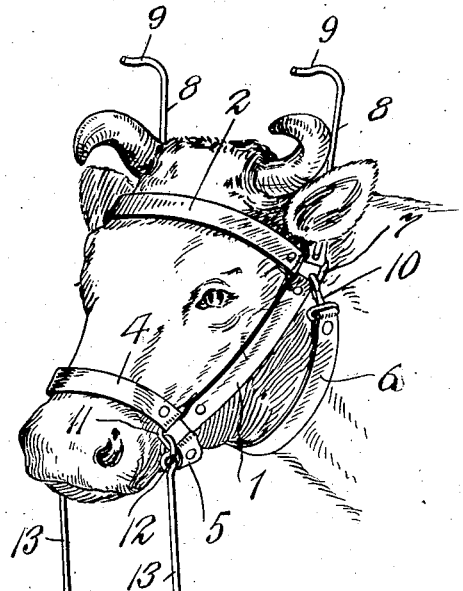
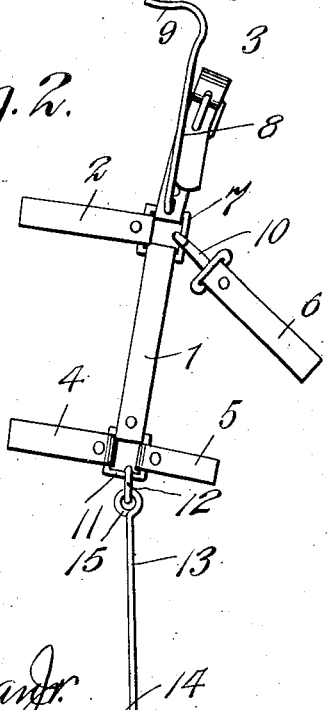
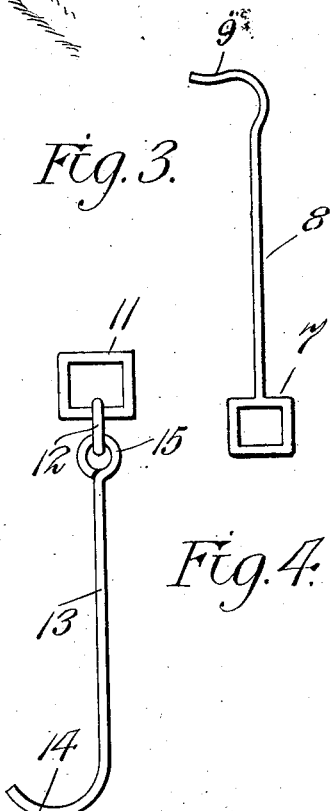
Inventor
Joel F. Carter
By Victor J. Evans
Attorney
Witnesses

UNITED STATES PATENT OFFICE.

JOEL F. CARTER, OF KAUFMAN, TEXAS.

ANIMAL-POKE.

No. 854,567.

Specification of Letters Patent.

Patented May 21, 1907.

Application filed October 24, 1906. Serial No. 340,394.

*To all whom it may concern:*

Be it known that I, JOEL F. CARTER, a citizen of the United States, residing at Kaufman, in the county of Kaufman and State of Texas, have invented new and useful Improvements in Animal-Pokes, of which the following is a specification.

This invention relates to animal pokes, designed for wear upon the head of the animal to prevent the animal from breaking or crawling through wire fences and the like, the object of the invention being to provide a simple, efficient and inexpensive device of this character.

In the accompanying drawings,—Figure 1 is a perspective view showing the application of the invention. Fig. 2 is a side elevation of the same. Fig. 3 is a detail view of one of the upper fender arms. Fig. 4 is a similar view of one of the lower fender arms and the means for supporting the same.

Referring to the drawings, 1 designates the side or cheek pieces; 2, the brow band; 3, the neck or head band; 4, the nose strap, 5, the under jaw strap, and 6, the throat latch or band of a halter, which is applied to the head of the animal and forms the support of the poke.

In accordance with my invention, the upper ends of the cheek pieces 1 and ends of the brow band and neck band are connected or coupled by means of metallic coupling rings or loops 7, which are provided with upwardly extending fender arms 8 provided with hooked upper ends 9. These arms extend from the upper sides of the connecting rings or loops 7 and pass through the ends of the neck band 3, the hooked ends 9 terminating above the head of the animal and having their hooked portions forwardly projecting to catch into the wires of a fence or other obstruction through which the animal attempts to pass. One end of the throat latch 6 may be permanently fastened to one of the loops 7, while the other end of said strap is preferably provided with a snap hook 10 to engage the other loop 7, thus providing for the ready application and removal of the halter.

The lower ends of the side pieces 1 are connected with the ends of the nose strap 4 and under jaw strap 5 by similar connecting rings 11, from which rings are hung supporting rings 12, to which are pivotally connected the upper ends of lower fender arms 13 having lower hooked terminals 14. The upper ends of the arms are preferably pivotally attached to the rings 12 by bending them to form eyes 15 engaging said rings, but they may be pivotally connected with the loops 11 in any preferred manner.

It will be observed that the upper fender arms 8 project above the top of the head of the animal, while the lower fender arms 13 depend from the forward portion of the head and are free to swing rearwardly to a limited degree. The upper fender arms prevent the animal from using his horns and upper portion of his head to force apart the wires of a fence, while the lower fender arms are adapted to catch into the wires of a fence to prevent the forward portion of the head from being inserted therethrough. The lower fender arms by being hung from the lower portion of the halter are adapted when meeting with an obstruction, such as the wires of a fence to pull backwardly and downwardly upon the nose strap, thus inducing the animal to retreat.

It will be seen that the invention provides an exceedingly simple and effective poke which may be manufactured at a low cost and will perform its function without injury to the animal.

Having thus described the invention, what is claimed as new, is:—

1. An animal poke comprising a halter embodying cheek pieces, a brow band, a head band, a nose strap, an under jaw strap and a throat latch, combined with upper coupling rings connecting the meeting ends of the cheek pieces, brow band and head band and adapted to suitably connect the ends of the throat latch thereto, upper fender arms rigid with said rings and extending upwardly therefrom, lower coupling rings independent of the upper coupling rings and connecting the meeting ends of the cheek pieces, nose strap and under jaw strap, and lower fender arms pivotally supported from said rings.

2. An animal poke comprising a halter having independent sets of upper and lower coupling rings uniting the elements thereof, upper hooked fender arms rigid with the upper coupling rings, and lower hooked fender arms pivotally supported by the lower coupling rings.

In testimony whereof, I affix my signature in presence of two witnesses.

JOEL F. CARTER.

Witnesses:
 GEO. G. SHAW,
 CLAUDE DEEN